US007692537B2

(12) United States Patent  
Sköld et al.

(10) Patent No.: US 7,692,537 B2
(45) Date of Patent: Apr. 6, 2010

(54) METHOD AND SYSTEM FOR AUTOMATICALLY DECIDING WHAT ALARM, GENERATED IN AN INDUSTRIAL PLANT, TO HIDE OR TO PRESENT TO AN OPERATOR

(75) Inventors: Mikael Sköld, Täby (SE); Magne Hansen, Eskilstuna (SE); Jan Gjerseth, Västerås (SE)

(73) Assignee: ABB AB, Västerås (SE)

( * ) Notice: Subject to any disclaimer, the term of this patent is extended or adjusted under 35 U.S.C. 154(b) by 750 days.

(21) Appl. No.: 11/311,903

(22) Filed: Dec. 20, 2005

(65) Prior Publication Data

US 2006/0190584 A1 Aug. 24, 2006

(30) Foreign Application Priority Data

Dec. 20, 2004 (SE) .................................. 0403153

(51) Int. Cl.
*G08B 29/00* (2006.01)
(52) U.S. Cl. .................. 340/506; 340/500; 340/511; 709/223; 709/203
(58) Field of Classification Search ................. 340/506, 340/500, 511, 540, 517, 521, 524, 825.36, 340/825.49; 717/165, 167; 709/203, 217, 709/229, 225, 224, 223
See application file for complete search history.

(56) References Cited

U.S. PATENT DOCUMENTS 5,400,246 A * 3/1995 Wilson et al. ................. 700/17

| | | | |
|---|---|---|---|
| 5,581,242 A | 12/1996 | Arita et al. | |
| 6,535,122 B1 * | 3/2003 | Bristol | 340/506 |
| 6,631,363 B1 * | 10/2003 | Brown et al. | 707/1 |
| 6,694,513 B1 * | 2/2004 | Andersson et al. | 717/165 |
| 7,113,085 B2 * | 9/2006 | Havekost | 340/506 |
| 7,155,514 B1 * | 12/2006 | Milford | 709/225 |
| 2002/0163427 A1 * | 11/2002 | Eryurek et al. | 340/500 |
| 2003/0025599 A1 * | 2/2003 | Monroe | 340/531 |
| 2003/0117278 A1 * | 6/2003 | Fukuda et al. | 340/506 |
| 2005/0007249 A1 * | 1/2005 | Eryurek et al. | 340/511 |
| 2005/0033802 A1 * | 2/2005 | Pauly et al. | 709/203 |
| 2006/0129682 A1 * | 6/2006 | Hansen et al. | 709/229 |
| 2007/0001806 A1 * | 1/2007 | Poll | 340/7.59 |

FOREIGN PATENT DOCUMENTS

WO WO 01/02953 1/2001

* cited by examiner

*Primary Examiner*—Davetta W Goins
*Assistant Examiner*—Hoi C Lau
(74) *Attorney, Agent, or Firm*—Venable LLP; Eric J. Franklin (57) ABSTRACT

A method and an alarm processing system for deciding what alarm, out of a number of alarms generated in an industrial plant or process, to present to a system operator. The method includes creating hiding rules, associating each hiding rule with a real-world object, storing these rules in a storage means, receiving an alarm related to a real-world object, determining if a hiding rule is associated with the real-world object evaluating the hiding rule, deciding from the hiding rule whether to present or hide the alarm, selectively and actively hide such alarms that are decided to be hidden and not presenting the alarm to the system operator. The invention also includes an alarm processing system and a computer program for carrying out the method.

45 Claims, 12 Drawing Sheets

METHOD AND SYSTEM FOR AUTOMATICALLY DECIDING WHAT ALARM, GENERATED IN AN INDUSTRIAL PLANT, TO HIDE OR TO PRESENT TO AN OPERATOR

CROSS-REFERENCE TO RELATED APPLICATIONS

The present invention claims priority from Swedish patent application 0403153-0 filed 20 Dec. 2004.

TECHNICAL FIELD OF THE INVENTION

The present invention relates to a method and a system to handle alarms generated in an industrial plant. In particular it relates to a method and system to configure, select and execute rules that determine how to handle different alarms, i.e. whether to hide or to present an alarm to an operator.

BACKGROUND OF THE INVENTION

An industrial plant or process such as e.g. chemical plants, oil refineries, pulp and paper mills, steel mills etc includes many items or units of "real-world objects", which in many cases are controlled by a computer based control system. Control systems usually generate alarms when problems, related to these real-world objects, occur in order to alert either the system operator or other personnel involved in servicing the plant or process, so that the problem can be resolved as soon as possible.

Real-world objects in this context means physical entities/units such as sensors, valves, pumps, tanks, motors, conveyors, robots, computers, power supplies, network equipment etc. But a real-world object may also be an abstract entity that represents some physical equipment that is grouped together. Some examples of this type of collected physical equipment are production cells, production lines, production plants etc. A real-world object may also be an abstract entity that represents a software function, such as a calculation or a process model.

Figure 1:
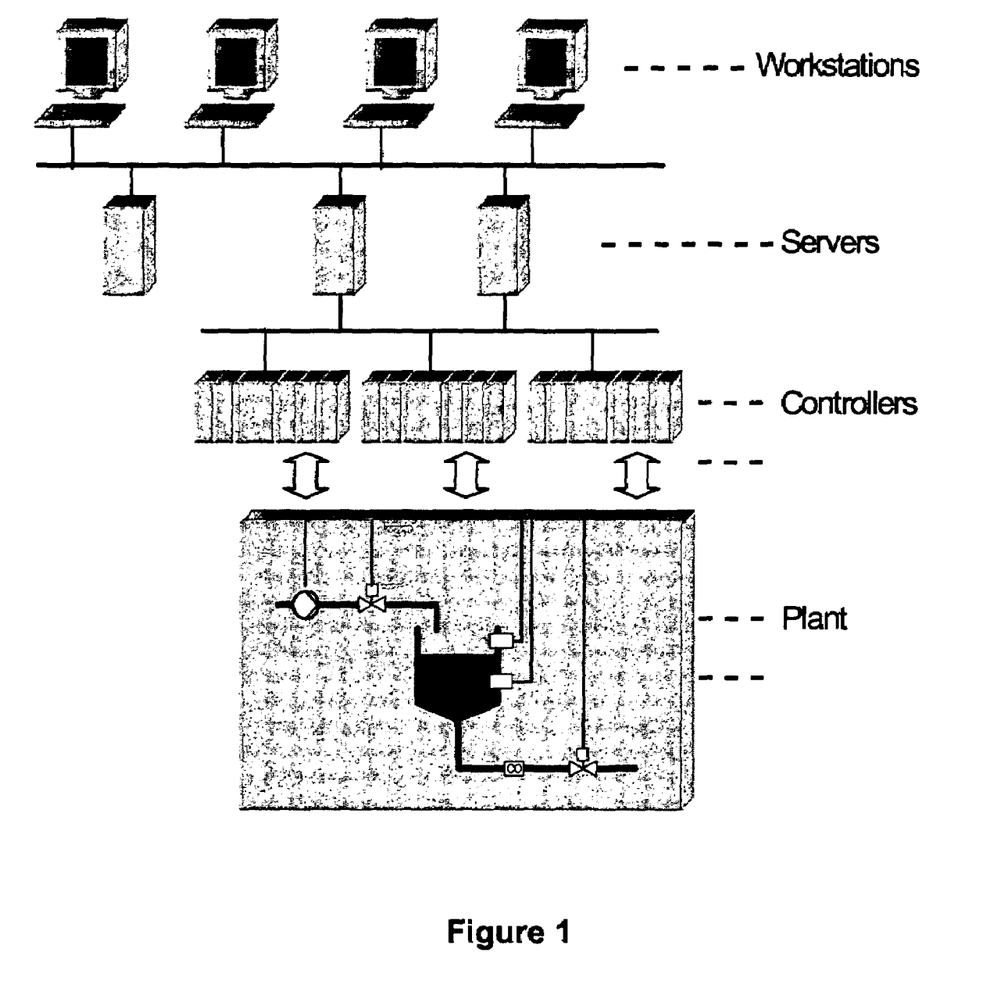
FIG. 1 shows schematically a typical computer-based control system for an industrial plant.

FIG. 1 illustrates an example of a typical computer based control system. It consists of controllers, servers and workstations connected to a local area network. Servers are computers that include software that provides various forms of system functionality. Workstations are computers that include software that provides various forms of user interaction. Controllers are computers that include software that performs the actual control functions. To the controllers, sensors and actuators are connected for measuring and affecting various forms of process variables, such as temperature, flow, pressure, level, position, on/off position etc. Variations of this basic structure are of course possible. For example, server and workstation functionality may reside in the same computer, or server and control functionality, or any other combination.

Besides functions for controlling a process, control systems normally also include monitoring or supervisory functions, including functions for generating alarms on various conditions related to the controlled and supervised real-world objects. A monitoring function is typically set to generate an alarm when a monitored object in some sense is outside its normal operating condition/range, for example a flow is too low or a temperature is too high or a level is below the minimum allowed or there is a failure in a power supply or in some network equipment etc.

Other sources of alarms include software applications such as applications for condition monitoring, optimization, calculations etc. A condition monitoring application may for example generate an alarm when a certain piece of equipment is in need of repair or maintenance. An optimisation application may generate an alarm when it is unable to maintain the controlled process within certain predetermined boundary conditions, such as maximum allowed energy consumption or product quality parameters etc. A calculation may for example generate an alarm when the result of a calculation is outside certain predetermined limits.

Control systems normally include software to collect, evaluate, store, and display alarm information. Such software is here referred to as an alarm processing system.

In a large plant there may be very large numbers of such sources of alarms, ranging from hundreds to hundreds of thousands, depending on the size of the plant. In many cases alarms may be generated without any real problem being present. This may for example be the case during start-up or shut down of a plant or a section of a plant, or during a shift from the production of one product or quality to another, or while a section of the plant is being serviced. Alarms generated under these conditions are not only confusing, they steal/occupy the operator's attention from more important information, and they make the operator's work stressful.

Other examples where alarms are not important or relevant are when they are generated because of secondary faults. For example, if a pump fails the corresponding flow and pressure will soon be too low. An alarm on the pump failure is enough to raise the operators attention to the problem, the following or consequential alarms caused by the flow and the pressure being too low are not needed for the operator determining the real cause of the problem.

Traditional ways of dealing with this problem involves suppressing the alarm signals at the alarm source, i.e. functionality is added in the controllers and software applications where alarms are generated, to prevent the alarms from being generated under specific conditions. Besides the fact that it requires programming and can only be done by experts, this approach means that it is not possible to view the suppressed alarms at all, since they are never generated or transferred. Since the suppressing is done through programming, operator oriented documentation and overview of what alarms are suppressed under what conditions must be created and maintained manually, adding to the workload and complexity.

A better approach would be to make the alarm system configurable, such that a process engineer or a skilled operator can decide to temporarily hide alarms from certain objects under certain conditions. In this approach the alarms are still generated and may be stored/saved in the control system, and can later be viewed if necessary, but they are not presented to the operator as long as they are hidden.

WO01/02953 describes a method for integration of many and various types of applications in a computerized system. This method is based on a concept where real world objects are represented as composite. Different facets of a real world object, such as its physical location, the current stage in a process, a control function, an operator interaction etc., are described as different aspects of the composite object. In this application, composite objects as defined by WO01/02953 are referred to as aspect objects.

A feature of the method described in WO01/02953 is that aspect objects can be organized in structures. A structure of aspect objects is a hierarchy of object instances. It may be based on any type of relations between aspect object instances. An aspect object can be placed in several structures at the same time, where the different structures represent different relations, e.g. functional and physical containment (functional structure and location structure).

EP 1442413 describes a method and system for a client application to request a data item from a data source in a computer controlled control system, via an access server. The control system includes software objects and a plurality of access servers. The software objects represent various entities that have a defined functional meaning in the control system. Each access server, such as an OPC (Object linking & embedding for Processor Control) server, may provide access to one or more real-time data, historical data, and alarm and event data items. EP 1442413 describes means, by which information held by said objects is used to find out which access server handles a particular data item and to access the data item, transparently to the client application.

U.S. Pat. No. 5,581,242 describe an automatic alarm display processing system in which derivative alarms are suppressed when a failure arises in a plant. The described system uses table look-up to find a causal relation between an alarm and an event and device monitor information in a table that contains alarm suppression reasons for a plurality of alarms. The table is used to decide whether an alarm is to be displayed without use of any inference function, thus avoiding long processing times.

SUMMARY OF THE INVENTION

One object of the present invention is to automatically hide irrelevant alarms in a computer-based system for process control. An alarm is considered irrelevant if it does not require attention from the operator. A hidden alarm is not displayed and does not require acknowledgement or any action from the operator. A "hidden alarm" is an alarm that is registered in the system but that is not presented to the operator until he actively requests to have it presented.

This and other objects are achieved according to the present invention by a method, and a system, and a computer program product.

According to the invention, the hiding of alarms is controlled by "hiding rules". A hiding rule is a logical expression that is associated with a particular real-world object, and that involves one or more process and/or alarm conditions. A process condition in this context indicates the current status of a real-world object in some respect. A process condition can for example reflect a process variable, such as the position of a switch or the level in a tank, or it can be determined by a variable that is set and controlled by an operator or other user, such as a manual/auto switch, or the operational mode of a production cell, or it can be determined by a variable that is calculated by a software application. Correspondingly, an alarm condition indicates whether a particular alarm is active.

This makes it possible to hide an alarm based on a certain combination of conditions in the process and earlier alarms. A hiding rule can hide a specific alarm that is related to the real-world object it is associated with, e.g. the High alarm, or all alarms that are related to the real-world object.

The following are examples of hiding rules. Other types of conditions and forms of syntax for the expressions are of course possible:

If "PC101.man_mode"=TRUE then hide "PC101". This rule will hide all alarms from the object PC101 when it is in manual mode.

If "Motor101.LowAlarm_IsActive"=TRUE then hide "PC101". This rule will hide all alarms from the object PC101 when there is an active "low" alarm on Motor101.

If "Motor101.LowAlarm_IsActive"=TRUE then hide "PC101.HighAlarm". This rule will hide only the "High" alarm from PC101, but not other alarms such as the Low alarm.

One advantage of the invention is that it relieves the operator from being disturbed by less important or irrelevant alarms, which may otherwise obscure more important information and create a stressful working situation.

Another advantage of the invention is the simplicity, by which hiding rules can be created and grouped to hide single alarms or groups of alarms coming from one or many sources.

Yet another benefit of the invention is that it is not based on suppressing the generation of alarms at the source. Instead, irrelevant alarms are only excluded from presentation to the operator as long as a defined set of conditions prevail, and are available for inspection when these conditions no longer prevail.

BRIEF DESCRIPTION OF THE DRAWINGS

The present invention will be described in more detail in the following, with reference to the attached drawings, in which.

DESCRIPTION OF THE PREFERRED EMBODIMENTS

Figure 2:
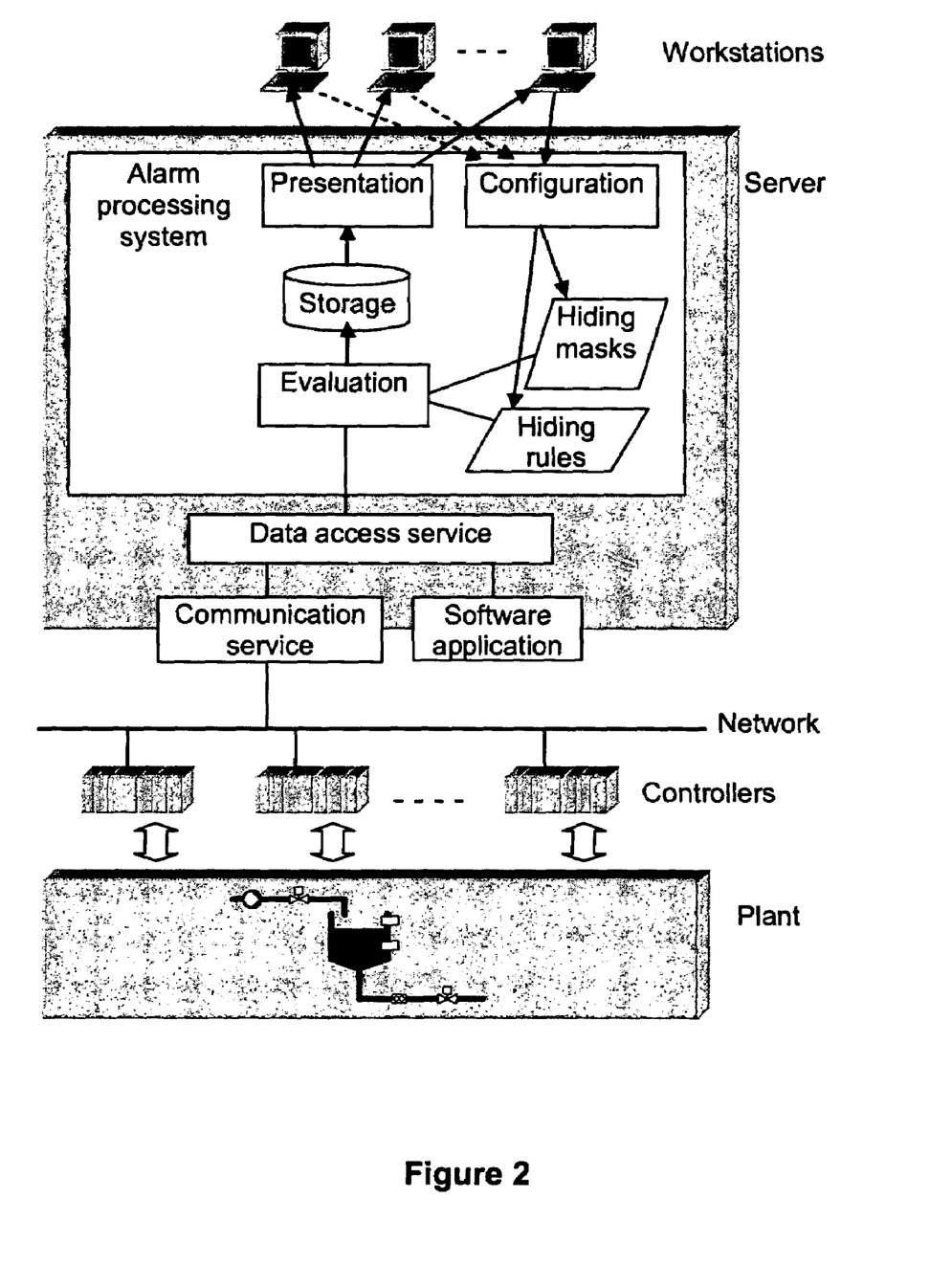
FIG. 2 shows a control system, for an industrial plant, that includes an alarm processing system.

FIG. 2 shows an example of a control system that includes an alarm processing system that includes means for hiding irrelevant alarms according to the method defined by the present invention. The alarm processing system receives information about process and alarm conditions from various sources where these conditions are detected. Examples of such sources include controllers and various software applications.

The alarm processing system includes means, e.g. a hard disc, for storing information about a plurality of alarms, including information about the source, time of occurrence, and nature of each alarm. The alarm processing system also includes means, an evaluation unit, to evaluate logical expressions, such as hiding rules and hiding mask activation conditions. Further, the alarm processing system includes means, i.e. a workstation, to display information about alarms to an operator, using various formats, including lists.

Figure 3:
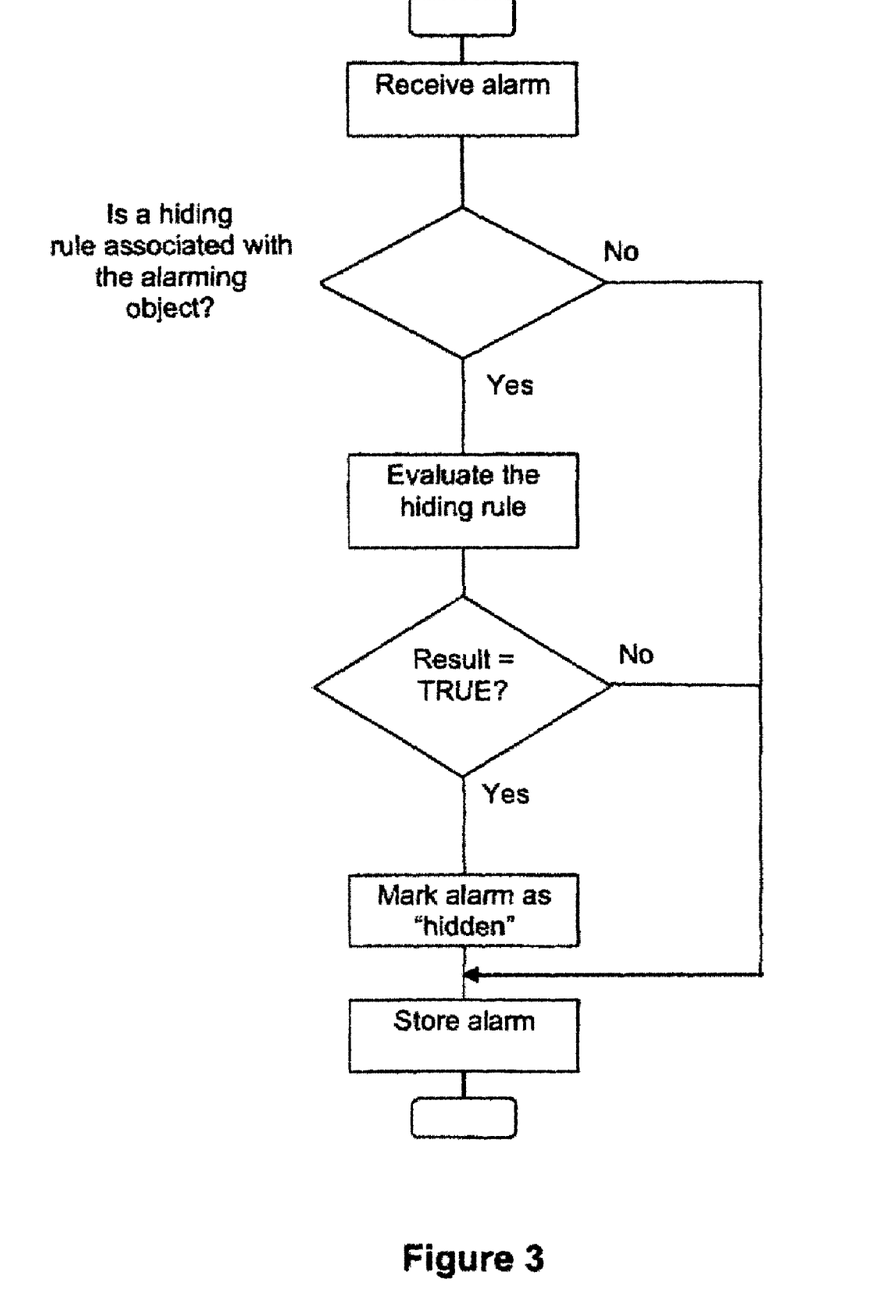
FIG. 3 shows some steps involved in evaluating a hiding rule.

FIG. 3 shows the steps involved in performing one embodiment of the invention, where the alarm processing system receives information about a new alarm relating to a particular real-world object. A check is made if there is any hiding rule defined for that real-world object. If a hiding rule is found, the logical expression is evaluated, and if the result is "TRUE", the alarm is marked as "hidden" before it is stored in the alarm storage. When the alarm processing system displays/presents alarms to an operator or some other user, alarms that are hidden are excluded from being presented. In another embodiment, it is possible that these steps can be performed in a different order.

Figure 4:
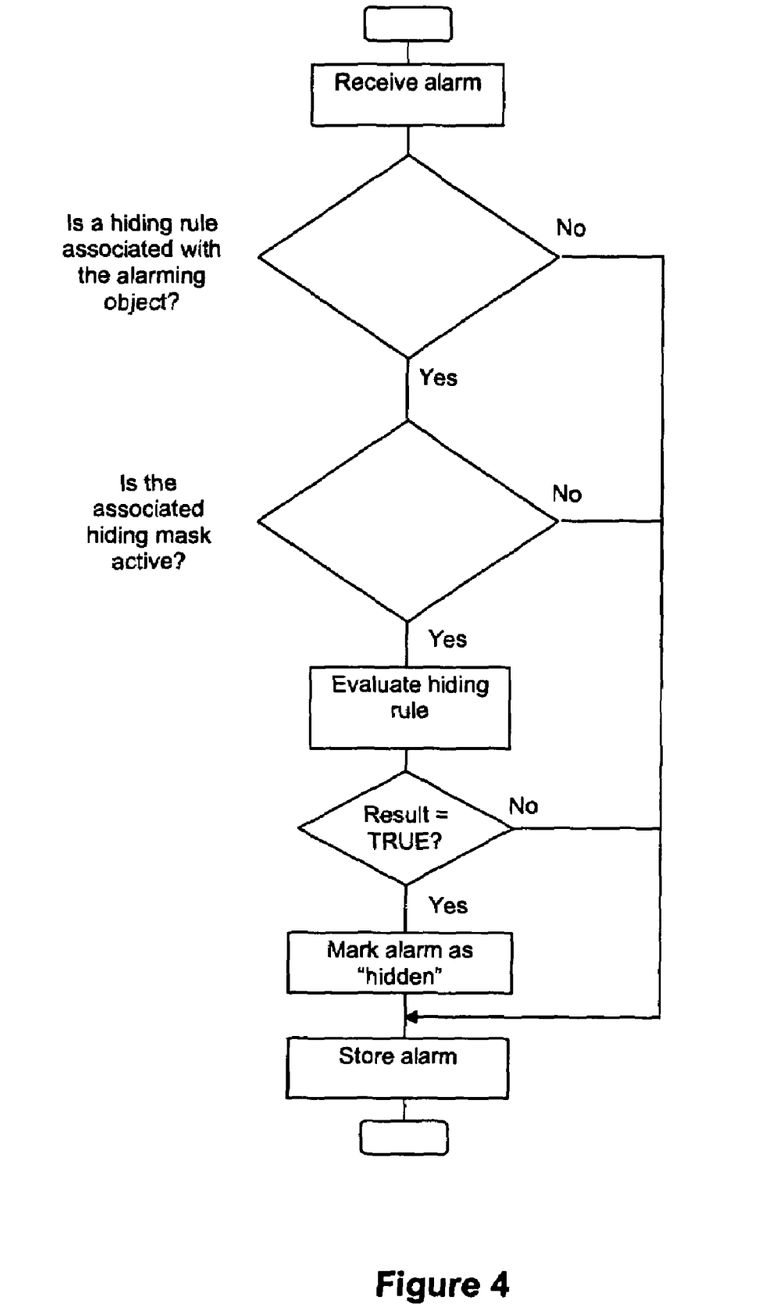
FIG. 4 shows some steps involved in evaluating a hiding mask activation condition and a hiding rule.
Figure 6:
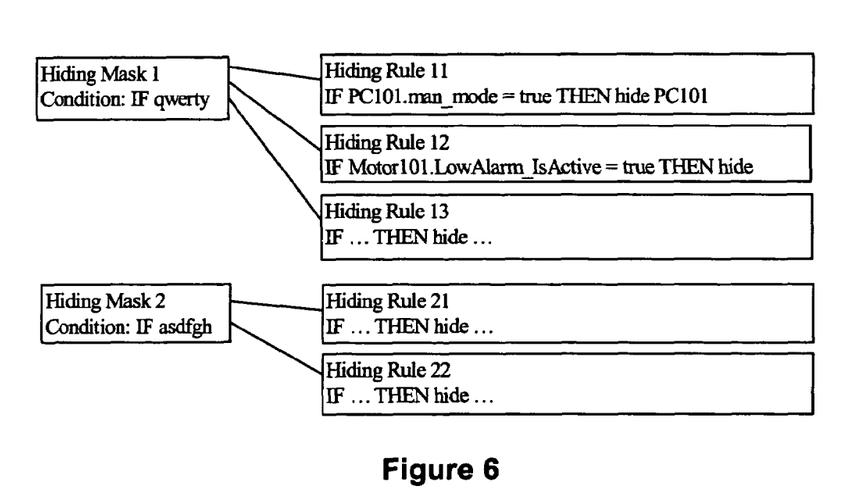
FIG. 6 shows in which way hiding rules are associated with hiding masks in an embodiment of the invention

FIG. 4 shows a further embodiment where hiding masks are used to control the application of alarm hiding rules. As can be seen in FIG. 6 the hiding masks 1 and 2 each defines a collection of hiding rules that will be evaluated under a certain condition. A hiding mask typically corresponds to a specific operational mode, such as start-up or shut down of the plant or a section of the plant, or a shift from the production of one product or quality to another, or maintenance work on a piece of equipment or a section of the plant. A hiding mask has an activating condition that, when it is evaluated to true, will enable all the associated hiding rules. The activating condition is a logical expression of one or more process and/or alarm conditions.

In this further embodiment, when the alarm processing system receives information about a new alarm related to a particular real-world object, it checks if there is any hiding rule defined for that real-world object. If it finds a hiding rule, it first evaluates the corresponding hiding mask activation condition to check if the hiding mask is active. If the hiding mask is active, the alarm processing system then evaluates the hiding rule, and if the result is TRUE, the alarm processing system marks the alarm as "hidden" before it stores it in the alarm storage. These steps can of course be performed in a different order.

The use of hiding masks provides several benefits. One benefit is that it simplifies configuration of alarm hiding by keeping together all hiding rules that shall be active under the same conditions. Another benefit is that it provides simple means to activate and deactivate a number of hiding rules based on the result of a logical expression.

Figure 5:
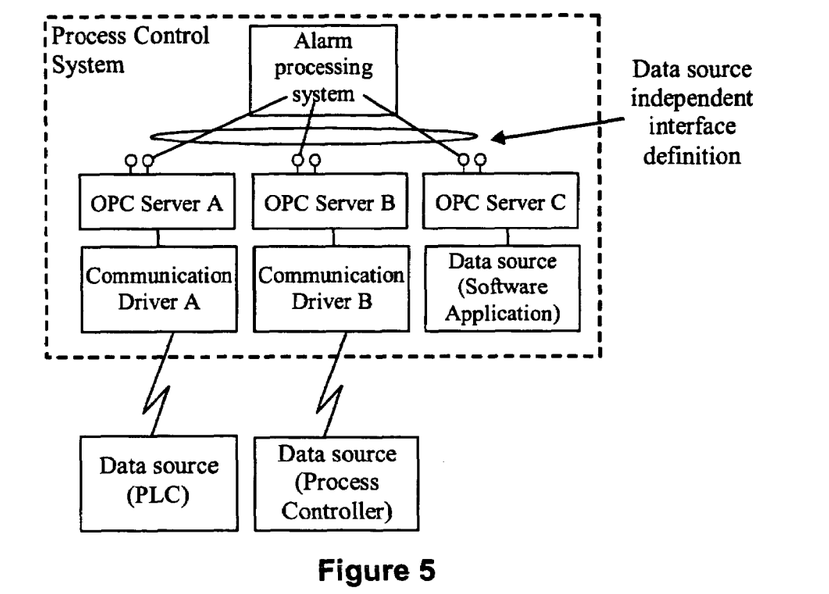
FIG. 5 shows the alarm processing system as a client to data access servers, as described in EP 1442413

FIG. 5 shows another embodiment of the invention where the alarm system receives information on process conditions and alarms by subscribing to this information from an access server, such as an OPC server, as described in EP1442413. In this embodiment, process and alarm conditions are represented by OPC items, hiding rules are logical expressions of OPC items, and hiding mask activating conditions are logical expressions of OPC items.

In another embodiment of the invention, a hidden alarm is automatically acknowledged when the alarm is cleared, i.e. when it goes from active to inactive state. In a still further embodiment, when a hiding rule is deactivated, i.e. no longer evaluates to true, all alarms that were hidden by that rule are no longer hidden. In a further embodiment, the display function of the alarm processing system provides means for specifically requesting the display of hidden alarms.

Figure 7:
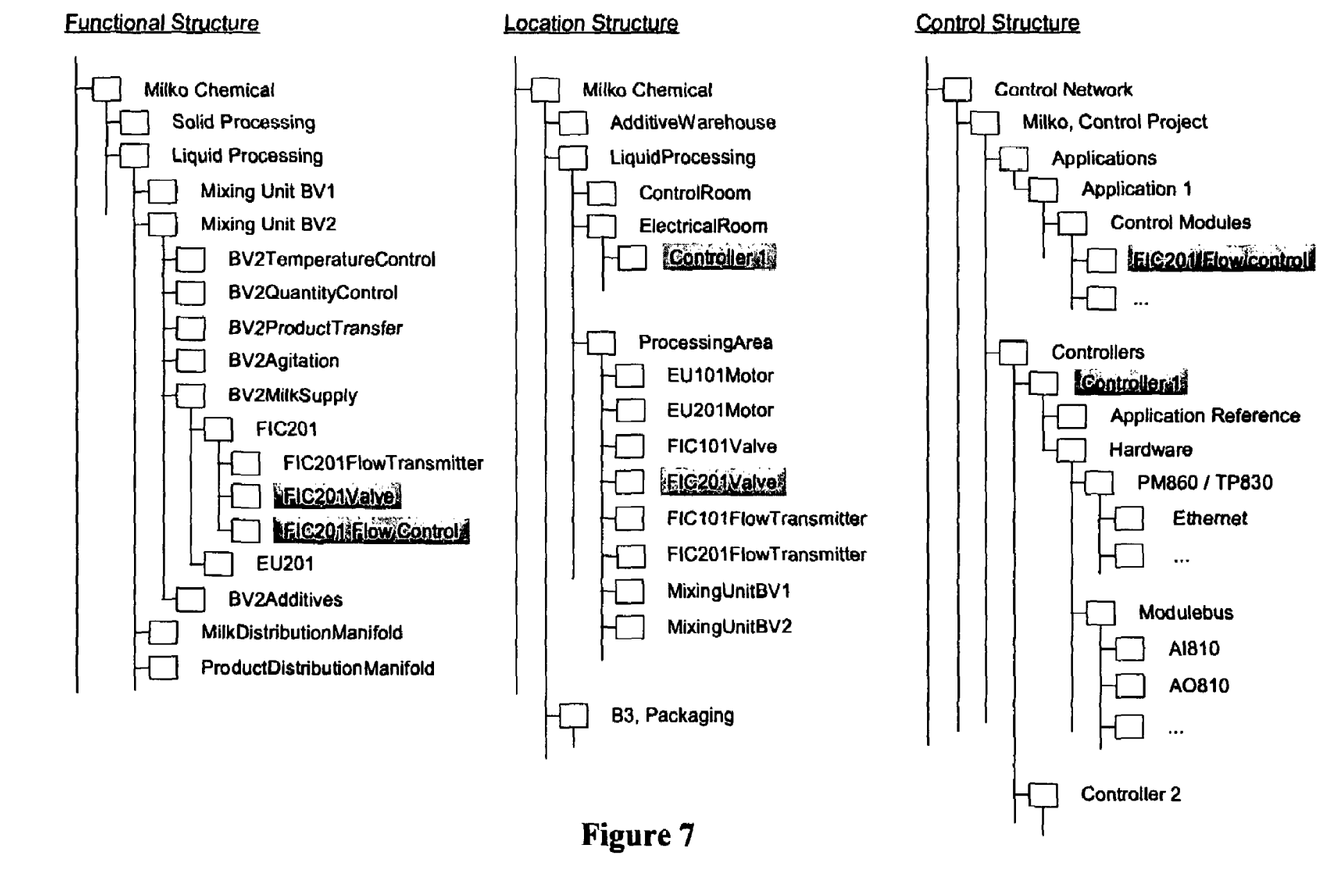
FIG. 7 shows how software object instances may be organized in structures based on different types of relations between the objects, such as functional containment, physical location, or grouping of control system functions, as described in WO01/02953.

In a preferred embodiment of the invention, the control system includes software objects that represent the real-world objects for which alarms can be generated. In this embodiment, each hiding rule is associated with the software object that represents the real-world object for which alarms shall be hidden. In a further embodiment, the software objects can be arranged in multiple structures, where each structure represents a certain type of relation between the represented real-world objects, such as functional containment, or location, or the grouping of control system functions, as shown in FIG. 7.

Figure 8:
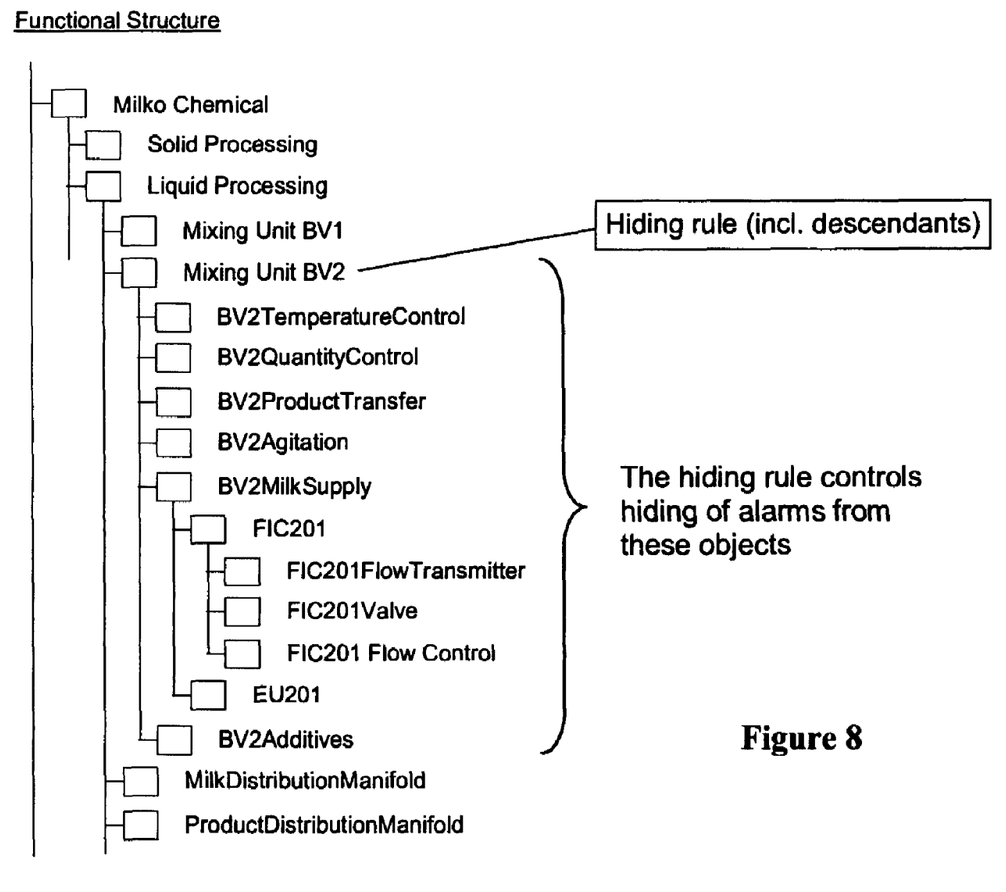
FIG. 8 shows a structure, with an aspect object that has a hiding rule aspect that is defined to control hiding of alarms from the object it is attached to, plus all it's descendants in the structure.

In a further embodiment, illustrated in FIG. 8, a hiding rule can be configured to hide alarms not only related to the real-world object it is associated with but also from all descendants (subordinated objects) in a structure that the corresponding software object is located in. This is particularly beneficial, in that it makes it possible to define one rule that hides alarms related to all objects that belong to a particular process function involving many objects, if the functional structure is specified, or all objects that are located in a particular area, if the location structure is specified, or all objects that are controlled from a particular process controller, if the control structure is specified etc.

Figure 9:
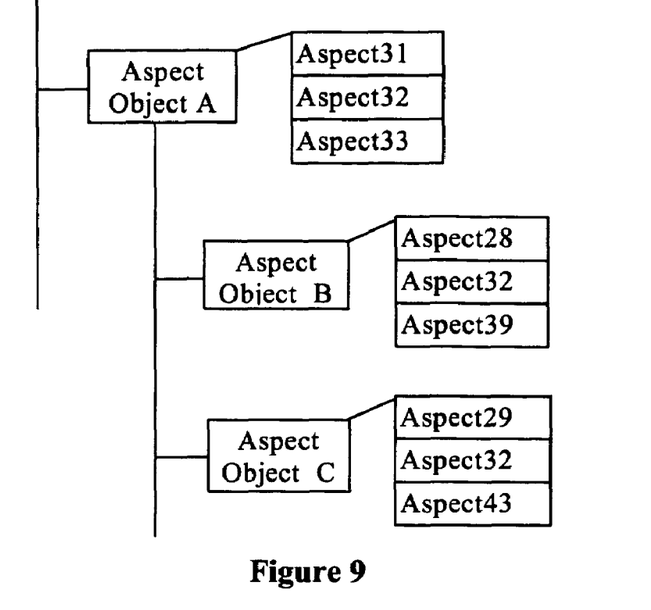
FIG. 9 illustrates the concept of composite objects (here referred to as aspect objects) and aspects, as described in WO01/02953.
Figure 10:
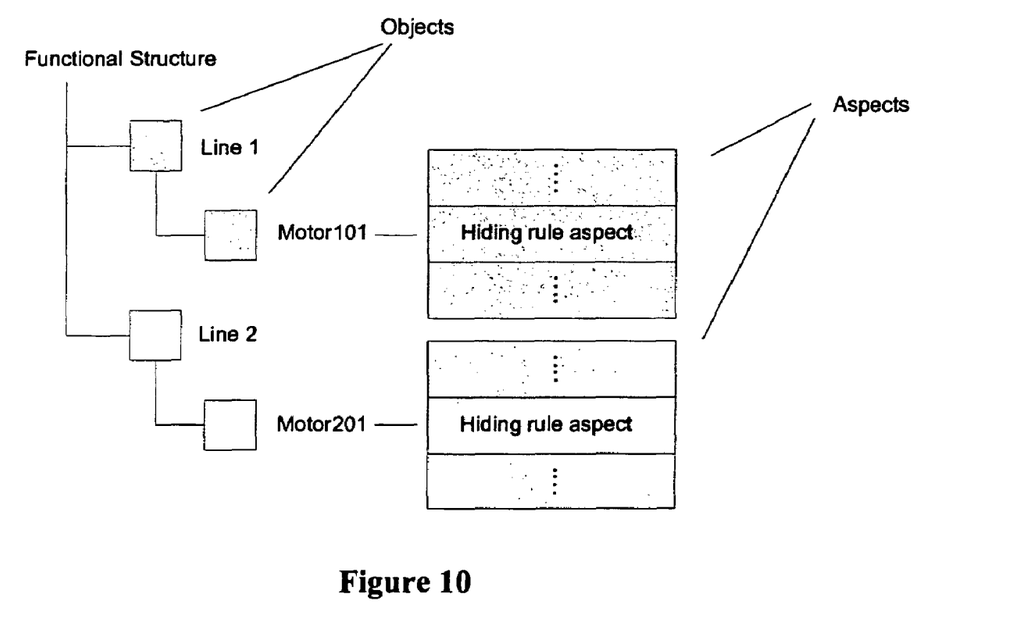
FIG. 10 shows how hiding rules can be implemented as aspects of aspect objects, in an embodiment of the present invention.

FIG. 9 shows a further embodiment including software objects that are composite objects as described in WO01/02953, here referred to as aspect objects, and each hiding rule is an aspect of the aspect object for which said hiding rule is defined (FIG. 10).

Figure 11:
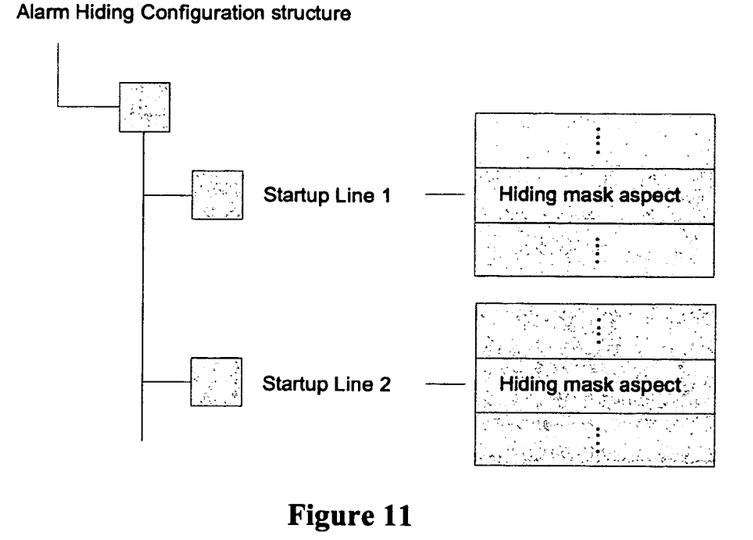
FIG. 11 shows how hiding masks are implemented as aspects of aspect objects, in an embodiment of the present invention.

In a further embodiment the hiding masks are aspects of aspect objects that hold configuration data. These aspect objects may be placed in any structure. For the purpose of this description, it is assumed that they are placed in a separate "alarm hiding configuration structure". Hiding mask objects have a "Hiding Mask Definition" aspect, which holds the hiding mask configuration (FIG. 11).

Hiding masks and hiding rules are tightly coupled. In a preferred embodiment, a hiding mask's activating condition is stored in a hiding mask aspect and the hiding rules that are associated with the hiding mask are stored in hiding rule aspects on the aspect objects where alarms shall be hidden. The association of a hiding rule to a hiding mask may for instance be implemented as a reference to the hiding mask, stored by the hiding rule aspect.

Figure 12:
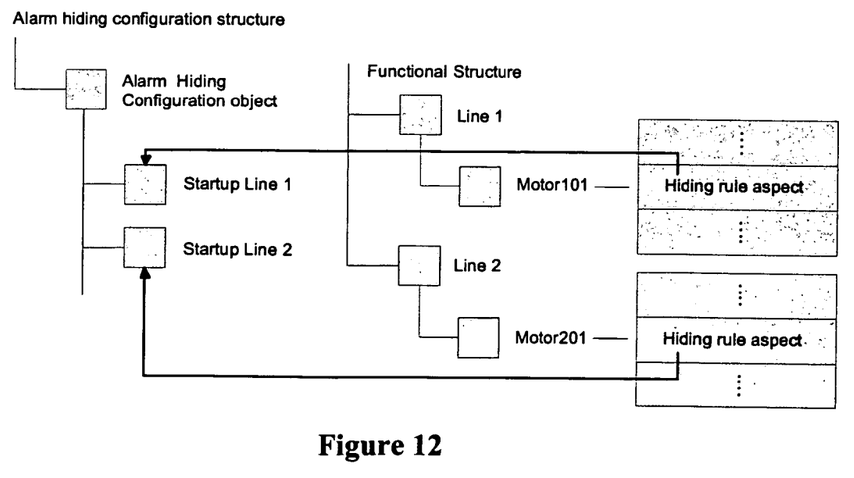
FIG. 12 shows how hiding rule aspects and hiding mask aspects are related in an embodiment of the present invention.

In the example illustrated by FIG. 12, a hiding rule is to be associated with the real-world object "Motor101". The hiding rule shall be active during start-up of the production line 1. This is accomplished by adding a hiding rule aspect to the aspect object that represents Motor101. This aspect stores the actual hiding rule, and also a reference to the hiding mask named Startup Line 1. When the alarm processing system receives information about a new alarm from Motor101, it will find the hiding rule that is associated with the aspect object that represents Motor101, follow the reference to the hiding mask Startup Line 1, evaluate the mask's activation condition, and if the result is true, evaluate the hiding rule.

In a further embodiment, the alarm processing system is an aspect system, as described in WO01/02953 that provides implementations for the hiding rule and the hiding mask aspect types.

Figure 13:
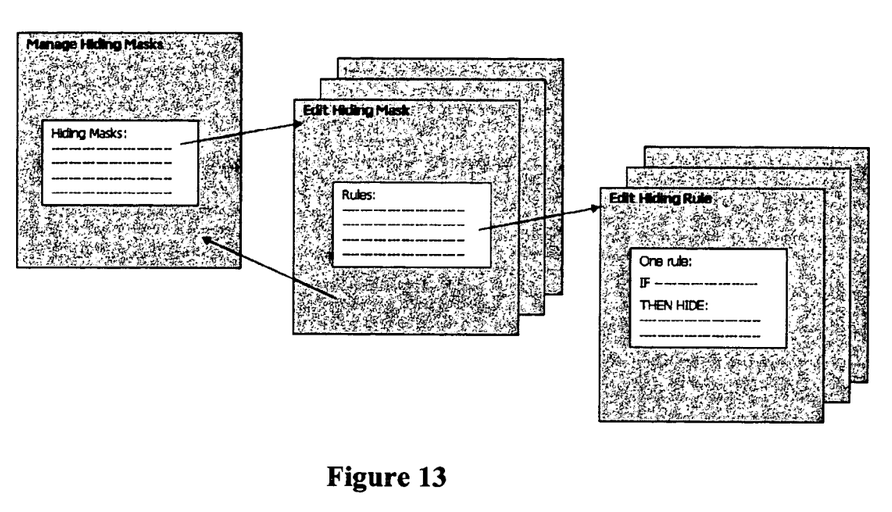
FIG. 13 show how a hiding mask manager can be used to facilitate the configuration of hiding masks and hiding rules.

In a preferred embodiment a hiding mask manager, i.e. a computer program, is used to view and manage the total collection of hiding masks and hiding rules, and for various operations on hiding masks/rules, such as create new hiding mask/rules, delete hiding mask/rule and copy a hiding mask/rule, as shown in FIG. 13.

In the embodiment where hiding rules and hiding masks are implemented as aspects to aspect objects, the hiding mask manager is preferably implemented as a "Hiding Mask Manager" aspect to a root object in the "alarm hiding configuration structure", as shown in FIG. 12.

Figure 14:
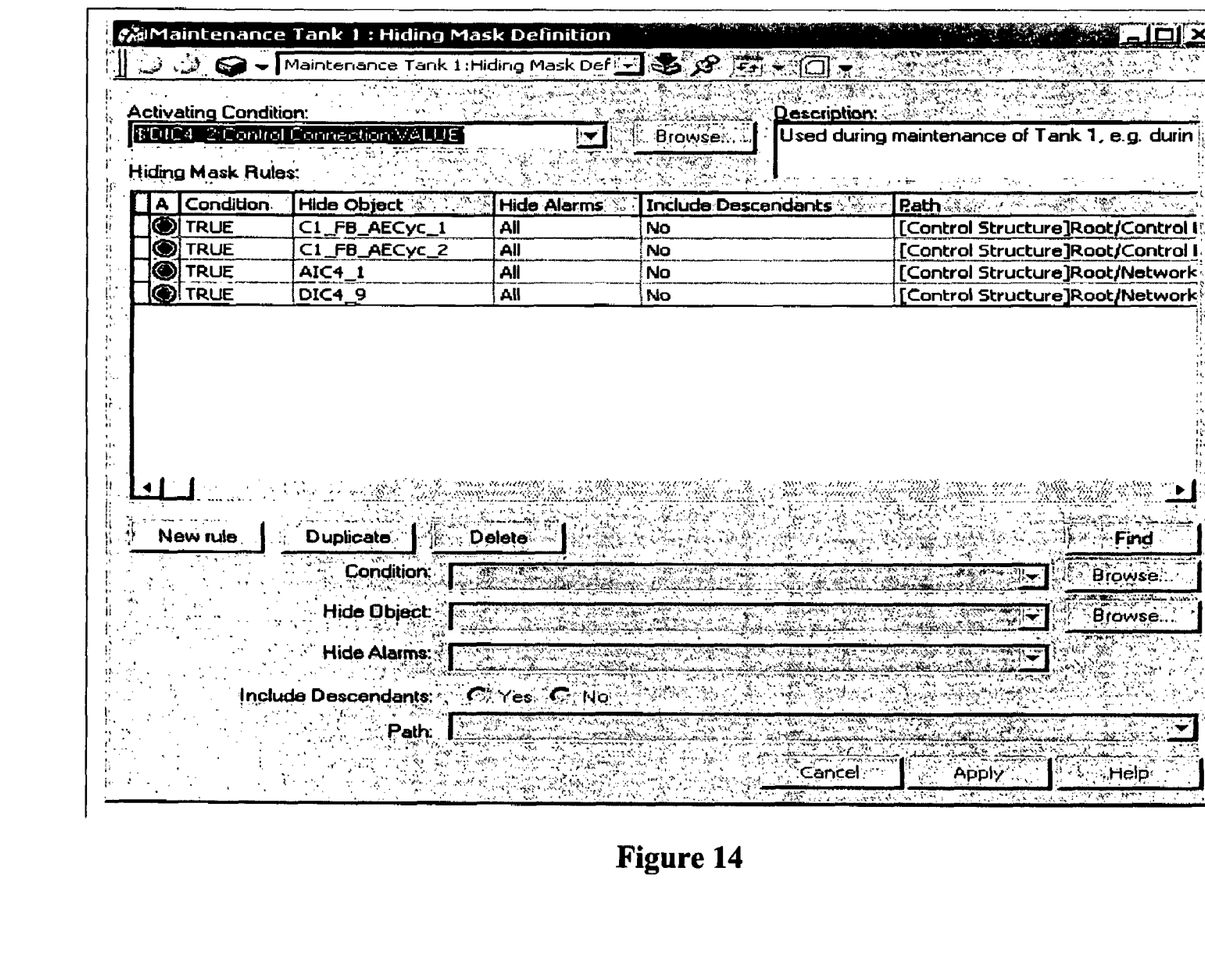
FIGS. 14 and 15 show examples of user interfaces for configuration on hiding masks and hiding rules.
Figure 15:
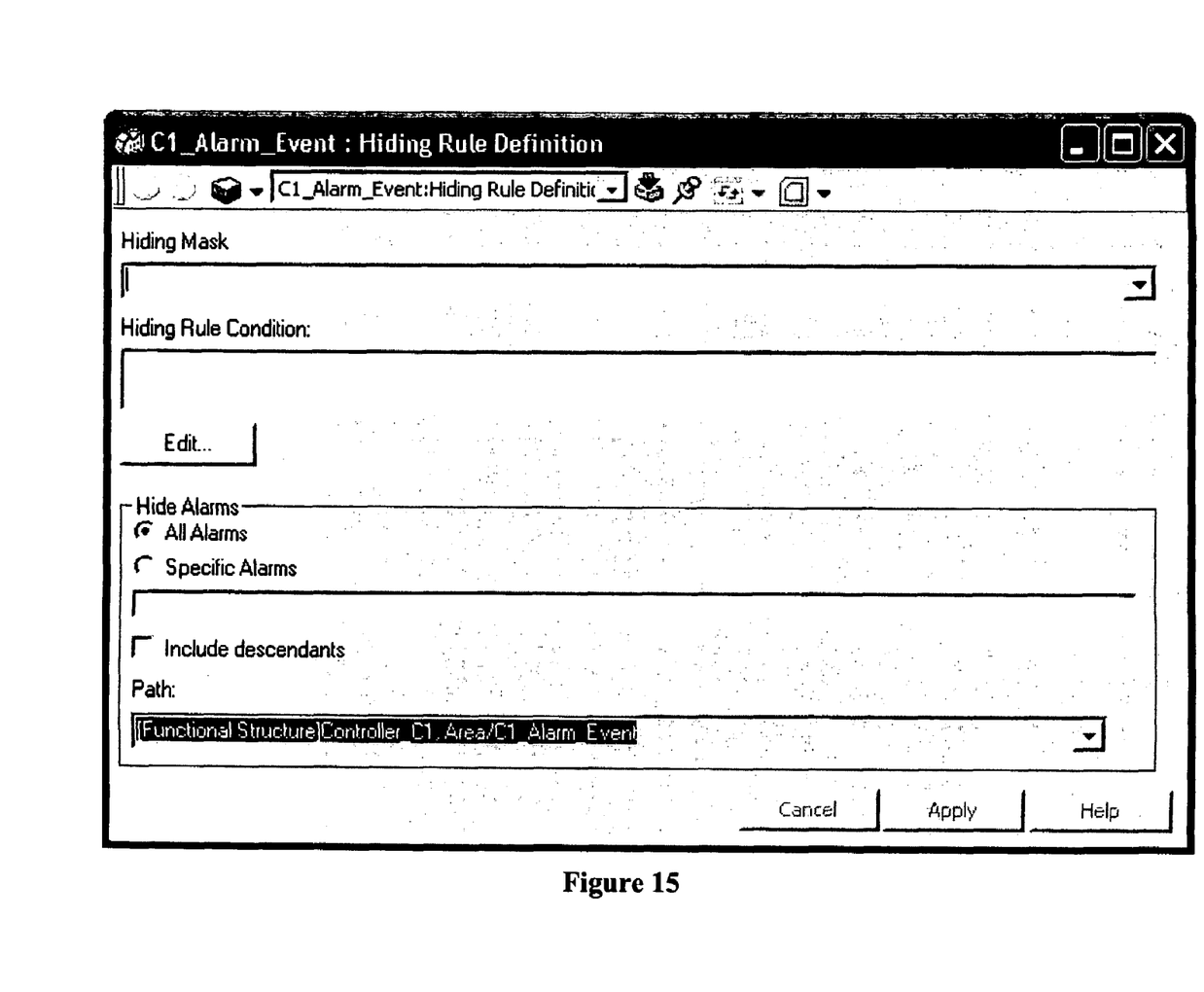

In a preferred embodiment there is a configuration utility by which the operator or some other user can create new hiding rules and hiding masks, and edit or delete existing ones. In the embodiment where hiding rules and hiding masks are implemented as aspects to aspect objects, this utility is a function provided by the hiding rule and hiding mask aspect types. In the preferred embodiment where a hiding mask manager object is defined, the hiding mask manager object serves as the entry point from which the user can navigate to all hiding masks and hiding rules. This is illustrated in FIG. 13. FIGS. 14 and 15 show examples of what the user interfaces for the hiding mask and hiding rule configuration could look like.

Alternatively it would be possible to generate the hiding conditions and hiding masks by means of an off-line utility, and then load them as configuration data to the alarm processing system. This off-line utility could use information derived from a mathematical or heuristic process model, or from a rule based or other form of knowledge base, as a basis for the generation of the hiding rules and hiding masks.

In this specification the invention has been described with reference to specific embodiments. It will, however, be evident that variations and modifications may be made of the invention without therefore departing from the spirit and scope of the claims.

We claim:

1. A method for deciding what alarm, out of a number of alarms generated in an industrial plant or process, to present to a system operator, the method comprising:
    creating hiding rules,
    associating each hiding rule with a real-world object,
    storing the hiding rules in a storage unit,
    creating at least one hiding mask corresponding to an operational mode of the industrial plant or process,
    associating at least one hiding rule with the at least one hiding mask, wherein hiding rules associated with the at least one hiding mask are selectively active,
    storing the at least one hiding mask in a storage unit,
    receiving an alarm related to a real-world object,
    determining if a hiding rule is associated with said real world object,
    determining if the at least one mask is active and if so if any hiding rules associated with the active mask are active,
    deciding from the hiding rules whether to present or hide the alarm by determining if the alarm falls within active hiding rules,
    selectively and actively hiding alarms that are decided to be hidden and not presenting the alarm to the system operator,
    presenting alarms that are not hidden, and
    setting a data item coupled to each hidden alarm to mark that the alarm has been hidden.

2. The method according to claim 1, further comprising:
    subscribing to information on process conditions and alarms from an access server.

3. The method according to claim 1, further comprising:
    automatically acknowledging a hidden alarm when the alarm is cleared.

4. The method according to claim 1, further comprising:
    presenting hidden alarms when specifically requested.

5. The method according to claim 1, further comprising:
    presenting hidden alarms when a related hiding rule is deactivated.

6. The method according to claim 1, further comprising:
    creating at least one software object that represents a real-world object, and associating a hiding rule relating to said real-world object with said software object.

7. The method according to claim 6, further comprising:
    arranging software objects in multiple structures, where each structure represents a certain type of relation between the software objects and the real-world objects.

8. The method according to claim 7, further comprising:
    configuring a hiding rule to hide alarms only from the real-world object with which the hiding rule is associated.

9. The method according to claim 7, further comprising:
    configuring a hiding rule to hide alarms from all descendants in a structure that the software object is located in.

10. The method according to claim 6, further comprising:
    implementing the software objects as aspect objects.

11. The method according to claim 10, further comprising:
    configuring each hiding rule as an aspect of the aspect object for which said hiding rule is defined.

12. The method according to claim 10, further comprising:
    configuring the at least one hiding mask as aspects of aspect objects that hold configuration data.

13. The method according to claim 11, further comprising:
    implementing the alarm processing system as an aspect system that provides implementations for the hiding rule and a type of the at least one hiding mask.

14. The method according to claim 1, further comprising:
    using a hiding mask manager to view and manage the total collection of the at least one hiding mask and hiding rules.

15. The method according to claim 1, further comprising:
    using a configuration utility for creation of new hiding rules and the at least one hiding mask, and for editing or deleting existing hiding rules and the at least one hiding mask.

16. The method according to claim 1, further comprising:
    generating the hiding rules and/or the at least one hiding mask utilizing an off-line utility, and loading the hiding rules and/or at least one hiding mask as configuration data to the alarm processing system.

17. An alarm processing system for deciding what alarm, out of a number of alarms generated in an industrial plant or process, to present to a system operator, comprising:
    a controller, said controller being configured to
    create hiding rules,
    associate each hiding rule with a real-world object,
    store the hiding rules in a storage unit,
    create at least one hiding mask corresponding to an operational mode of the industrial plant or process,
    associate at least one hiding rule with the at least one hiding mask, wherein hiding rules associated with the at least one hiding mask are selectively active,
    store the at least one hiding mask in a storage unit,
    receive an alarm related to a real-world object,
    determine if a hiding rule is associated with said real-world object,
    determine if the at least one mask is active and if so if any hiding rules associated with the active mask are active,
    decide from the hiding rule rules whether to present or hide the alarm by determining if the alarm falls within active hiding rules,
    selectively and actively hiding alarms that are decided to be hidden and not presenting the alarm to the system operator,
    presenting alarms that are not hidden, and set a data item coupled to each hidden alarm to mark that the alarm has been hidden.

18. The alarm processing system according to claim 17, wherein the controller is further configured to subscribe to information on process conditions and alarms from an access server.

19. The alarm processing system according to claim 17, wherein the controller is further configured to automatically acknowledge a hidden alarm when the alarm is cleared.

20. The alarm processing system according to claim 17, wherein the controller is further configured to present hidden alarms when specifically requested.

21. The alarm processing system according to claim 17, wherein the controller is further configured to present hidden alarms when a related hiding rule is deactivated.

22. The alarm processing system according to claim 17, wherein the controller is further configured to create at least one software object that represents a real-world object, and associate a hiding rule relating to said real-world object with said software object.

23. The alarm processing system according to claim 22, wherein the controller is further configured to arrange software objects in multiple structures, where each structure represents a certain type of relation between the software objects and the real objects.

24. The alarm processing system according to claim 23, wherein the controller is further configured to configure a hiding rule to hide alarms only from the real-world object it is associated with.

25. The alarm processing system according to claim 23, wherein the controller is further configured to configure a hiding rule to hide alarms from all descendants in a structure in which the software object is located.

26. The alarm processing system according to claim 22, wherein the software objects are aspect objects.

27. The alarm processing system according to claim 26, wherein each hiding rule is an aspect of the aspect object for which said hiding rule is defined.

28. The alarm processing system according to claim 22, wherein the at least one hiding mask is aspects of aspect objects that hold configuration data.

29. The alarm processing system according to claim 27, wherein the alarm processing system is an aspect system that provides implementations for the hiding rule and a type of the at least one hiding mask.

30. The alarm processing system according to claim 17, further comprising:
a hiding mask manager to view and manage the total collection of the at least one hiding mask and hiding rules.

31. The alarm processing system according to claim 17, further comprising:
a configuration utility for creation of new hiding rules and at least one hiding mask, and for editing or deleting existing hiding rules or at least one hiding mask.

32. The alarm processing system according to claim 17, wherein the controller is further configured to generate the hiding rules and/or at least one hiding mask utilizing an off-line utility, and load the hiding rules and/or at least one hiding mask as configuration data to the alarm processing system.

33. A computer program product, comprising:
a computer readable medium; and
computer program code recorded on the computer readable medium and executable by a processor for caffying out a method for deciding what alarm, out of a number of alarms generated in an industrial plant or process, to present to a system operator, the method comprising:
creating hiding rules,
associating each hiding rule with a real-world object,
storing the hiding rules in a storage unit,
creating at least one hiding mask corresponding to an operational mode of the industrial plant or process,
associating at least one hiding rule with the at least one hiding mask, wherein hiding rules associated with the at least one hiding mask are selectively active,
storing the at least one hiding mask in a storage unit,
receiving an alarm related to a real-world object,
determining if a hiding rule is associated with said real world object,
determining if the at least one mask is active and if so if any hiding rules associated with the active mask are active,
deciding from the hiding rules whether to present or hide the alarm by determining if the alarm falls within active hiding rules,
selectively and actively hiding alarms that are decided to be hidden and not presenting the alarm to the system operator,
presenting alarms that are not hidden, and
setting a data item coupled to each hidden alarm to mark that the arm alarm has been hidden.

34. The computer program product according to claim 33, wherein the method further comprises at least partially providing the computer program instructions through a network.

35. A method according to claim 2, wherein the access server is an OPC server.

36. A method according to claim 1, further comprising:
presenting hidden alarms when a related hiding rule is deactivated.

37. The method according to claim 7, wherein the certain type of relation between the objects is functional containment, location or the grouping of control system functions.

38. The method according to claim 14, wherein the hiding mask manager comprises a computer program.

39. The alarm processing system according to claim 18, wherein the access server is an OPC server.

40. The alarm processing system according to claim 17, wherein the controller is further configured to present presenting hidden alarms when a related hiding rule is deactivated.

41. The alarm processing system according to claim 23, wherein the certain type of relation between the objects comprises functional containment, location or the grouping of control system functions.

42. The alarm processing system according to claim 30, wherein the hiding mask manager comprises a computer program.

43. The computer program, according to claim 34, wherein the network is the internet.

44. The method according to claim 1, wherein the operational mode is a start-up or a shut down phase of the industrial plant or process, a shift from the production of one product or quality to another, or maintenance work on a piece of equipment or a section of the plant.

45. The alarm processing system according to claim 17, wherein the operational mode is a start-up or a shut down phase of the industrial plant or process, a shift from the production of one product or quality to another, or maintenance work on a piece of equipment or a section of the plant.

* * * * *